United States Patent [19]

Rollman

[11] Patent Number: 4,850,643
[45] Date of Patent: Jul. 25, 1989

[54] BICYCLE SEAT

[76] Inventor: Bruce L. Rollman, 23 Culin Dr., Cranford, N.J. 07016

[21] Appl. No.: 164,888

[22] Filed: Mar. 7, 1988

[51] Int. Cl.$^4$ .............................................. B62J 1/18
[52] U.S. Cl. ................................... 297/214; 297/195; 297/458; 297/DIG. 2
[58] Field of Search .............. 297/458, 459, 214, 195, 297/243, DIG. 2

[56] References Cited

U.S. PATENT DOCUMENTS

| 484,367 | 10/1892 | Hicks | 5/449 |
|---|---|---|---|
| 499,244 | 6/1893 | Naly et al. | 297/208 |
| 3,503,649 | 3/1970 | Johnson | 297/458 X |
| 4,062,585 | 12/1977 | Herring Jr. | 297/195 |
| 4,108,462 | 6/1978 | Martin | 280/289 E |
| 4,572,575 | 2/1986 | Golden et al. | 297/195 |
| 4,671,570 | 6/1987 | Hockenberry et al. | 297/DIG. 2 |

FOREIGN PATENT DOCUMENTS 386054  1/1933  United Kingdom ................ 297/214

Primary Examiner—James T. McCall

[57] ABSTRACT

A bicycle seat of the saddle type without a nose has a foam cushion supported on a seat shell and the foam cushion has depressions on the top surface thereof which support the ischial tuberosities and aid in promoting comfort of the cyclist. Springs at the front underside of the seat are attached to struts which are pivotally attached to the rear underside of the seat shell and act as a fulcrum when the weight of the cyclist depresses the springs. The top of the seat is roughened to prevent the cyclist from slipping off.

9 Claims, 2 Drawing Sheets

BICYCLE SEAT

BACKGROUND

A. Field of Invention

This invention relates to an improved bicycle seat suitable for use on all conventional bicycles, adult tricycles of the type generally associated with use by senior citizens and stationary exercise cycles.

B. Description of Prior Art

Conventional bicycle or adult tricycle seats of the saddle-type, i.e. those with a nose on the front of the seat, are relatively uncomfortable because the weight of the cyclist is borne on the seat by a relatively small area of the body. This may cause discomfort to the cyclist in the perineum or crotch.

Normal human anatomic variation may predispose certain individuals, when cycling, to suffer greater than average discomfort as well as certain physiological effects, e.g. torsion of testes, hematuria, pudenda neuritis, nocturia and saddle soreness. Groups of cyclists who may be particularly prone to discomfort and/or injury while using conventional seats may include men with enlarged prostate glands, women with a greater than average angle to their pubic arch and men and women with unusual anatomic variations to the distribution of their perineal nerves and blood vessels.

In addition, the shape of the conventional seat around its outer periphery is such that sore spots from friction can occur, most notably where the nose of the seat supports the perineum or crotch and rubs the inner thigh. This can also cause pain and discomfort to the cyclist, e.g. saddle burns. The areas of the seat which cause the saddle burns problem, in addition to the nose of the seat, are the peripheral contour of the seat and the character and contour of its top upon which the ischial tuberosities of the pelvis are supported.

There have been many efforts to design bicycle and adult tricycle seats which are comfortable and do not produce the above mentioned discomfort and possible injury to the cyclist, particularly after long trips during which design deficiencies of the seat are usually manifested. The sling-type seat disclosed in Marchelle, U.S. Pat. No. 4,176,890, known as the "Bummer" saddle, is an example of such a seat. This seat is very comfortable but it can interfere with the downward thrust of thighs while pedaling. In some instances, cyclists also noted a substantial tendency to slide forward during use of the seat.

Another bicycle seat, the "Easyseat" split saddle, uses two independent pivoting pads to support the ischial tuberosities. The pads can be adjusted inward or outward to match the cyclists pelvic width. On the average women have wider ischial tuberosities and longer crotches (perinea) than men which makes it difficult to have a comfortable seat suitable for all cyclists. The "Easyseat" has been found to be generally less comfortable than conventional seats because it does not provide support for the crotch or perineum.

Other bicycle seats are disclosed in U.S. Pat. Nos. 4,691,963; 4,673,212; 4,662,677; 4,613,187; and 4,572,575.

SUMMARY OF THE INVENTION

The bicycle or tricycle seat of this invention is comfortable and generally does not cause physical problems found in cyclists using conventional seats. The seat is designed so that its outer periphery does not include a nose. In addition, the shell of the seat which is rigid supports on its top surface a firm polymer foam cushion contoured to fit on the top and outer periphery of the supporting shell. The top surface of the cushion is contoured with laterally disposed concave areas in its rear portion to support the ischial tuberosities and accommodate the gluteal protuberances. Thus, the seat is of sufficient width to easily bridge the ischial tuberosities at their most convex angle of two standard deviations of the mean width for men and women. A centrally disposed convex area which extends from the front of the cushion approximately one half the distance toward the rear edge of the seat provides minimal support to the crotch and perineum and helps reduce the sliding of the cyclist on the seat. The convex area is formed from depressions on either side which are not as deep as the concave areas at the rear of the seat. The differences in depth of the concave anterior and posterior pairs of depressions results in a transverse ridge on the cushion. Looking at the front of the seat, the top of the seat appears to be undulate.

The cushion can be covered on its outer surface, and preferably is, by an attached flexible leather or plastic cover which is roughened on its outside surface to further reduce the chances of the cyclist slipping around on the seat. The cover over the cushion can be permanently attached or removable for cleaning purposes. It is preferably permanently attached to the seat cushion and can be washed or otherwise cleaned on the seat.

The shell which supports the seat cushion can be made either of rigid plastic, metal or a combination thereof. There are ridges or grooves in the bottom surface of the shell extending from front to back which impart additional rigidity to the shell. Preferably the ridges or grooves are perpendicular to the transverse axis of the shell. Springs, preferably helical and of the type and materials conventionally used for bicycle seats, such as metal or plastic springs, are attached at their top under the front of the shell and are supported at their bottoms by a strut structure comprising struts and a means to attach the struts to the seat shell and the springs, preferably two struts, a cross-bar and a bracket means. The strut structures are attached pivotally to the underside of the shell at the back thereof and are fixed to the springs at the front to provide a means for the front of the seat to move up and down in an arc, using the pivotal attachment of the struts as a fulcrum, in response to the cyclists weight which variably compresses the springs. The strut structure enables the seat to be attached to a bicycle or adult tricycle by conventional means, usually via a metal bracket which is removably attached to the struts and to the center post of the bicycle or tricycle frame. A preferred strut structure consists of a cross-bar supporting the bottom of the springs and resting on a leg of each strut which is attached to the bottom of the springs at the same location as the cross-bar.

DETAILED DESCRIPTION

Figure 1:
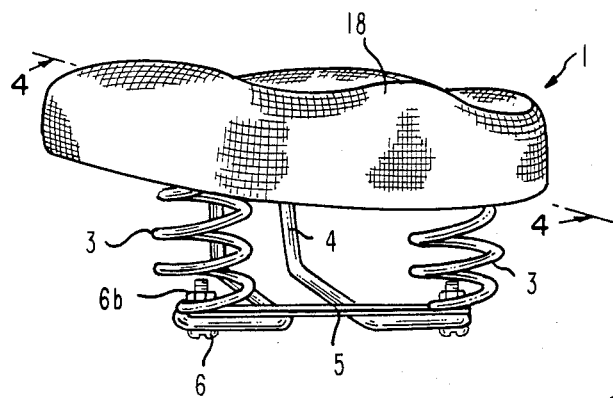
FIG. 1 is a front perspective view of the seat of this invention.

In FIGS. 1-4 a preferred embodiment of the seat 1 of this invention is illustrated showing the seat cover 11 which has dimensions permitting it to fit snugly over the cushion 2 and conform to the shape of said cushion 2. The seat cover 11 can be permanently or removably attached to the seat cushion 2 by conventional means. The seat cover 11 can be made of a durable and flexible material which is wear resistant. It has a roughened texture on its outer surface to provide frictive surface to help prevent the cyclist from slipping. Typical suitable cover materials are plastics, cloth and leather, all of which are satisfatory and are conventional materials for use as bicycle or adult tricycle seat covers. The criteria for choosing the seat cover material is the type of cycle on which the seat will be used, the desired wear resistance and the cost.

The cushion 2 is shaped so its underside conforms to the outer top surface and outer periphery walls or skirts of the shell 8 which supports the cushion 2 and the cover 11. The outside perimeter of the cushion 2 is generally four-sided with the skirts extending downward. The sidewalls 21 of the cushion 2 are generally perpendicular to and integral with the backwall 12 and meet said backwall 12 at rounded right angle corners. The front wall 15 is generally arcuate, is integral with and extends from the front end of each of the sidewalls 21. The front skirt 15 of the cushion has a greater height than the height of the backwall 12. This is clearly seen in FIG. 4. The cushion 2 is made from foamed polymers, preferably polyurethanes. The polymer should be resilient and relatively firm.

Figure 2:
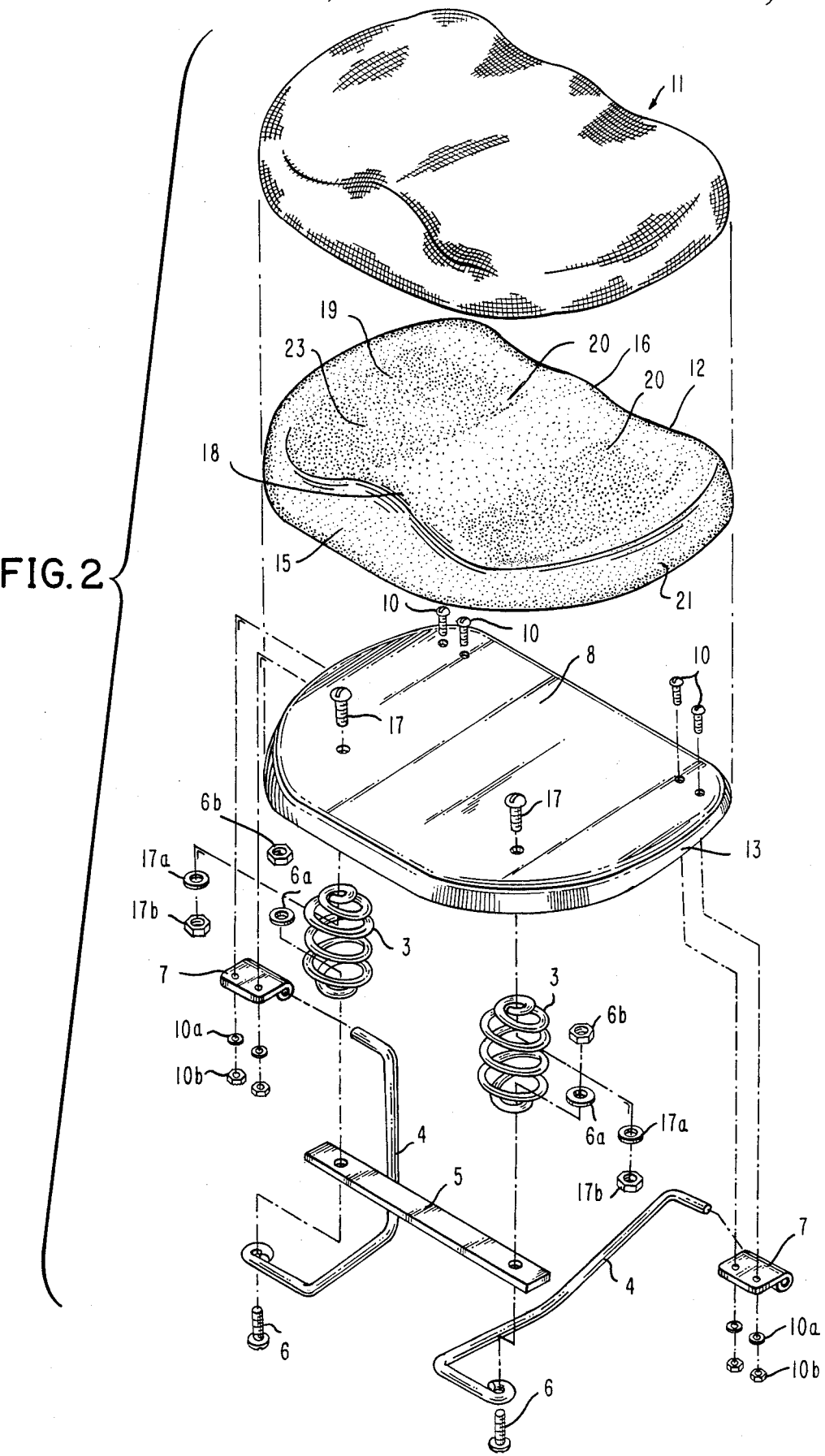
FIG. 2 is an exploded perspective view of the seat.

As can be seen in FIG.1, the front of the seat 1 is shaped so that the upper edge thereof has a wave-like profile, i.e. it has concave portions or depressions 23 as illustrated in FIG. 2 on either side of a rounded convex ridge 18 which extends from the front toward the back of the seat 1. The sides of the seat 1 are also rounded at the top of the seat 1 forming the lateral boundary of the depressions 23. The rear half of the seat 1, as can be seen in FIG. 2, has lateral depressions 20 which are deeper than the front depressions 23. Since the cushion 2 is thinner at the rear portion than at the front portion, the configuration of the top results in a transverse ridge 19 between the front and rear depressions. The ridge 19 is bevelled toward the rear of the seat 1. Extending from front to back between the depressions 20 is an extension 16 of the sagital elevation 18. This extension 16 is lower than the front sagital elevation 18. The profile of the rear of the seat is lower and has a flatter undulation than the front profile. This seat configuration enables the cyclist to remain comfortably on the seat 1 and helps prevent sliding forward or laterally. Also the seat configuration generously supports the cyclist's ischial tuberosities and places a minimum of weight bearing on their perineal and crotch areas.

Figure 3:
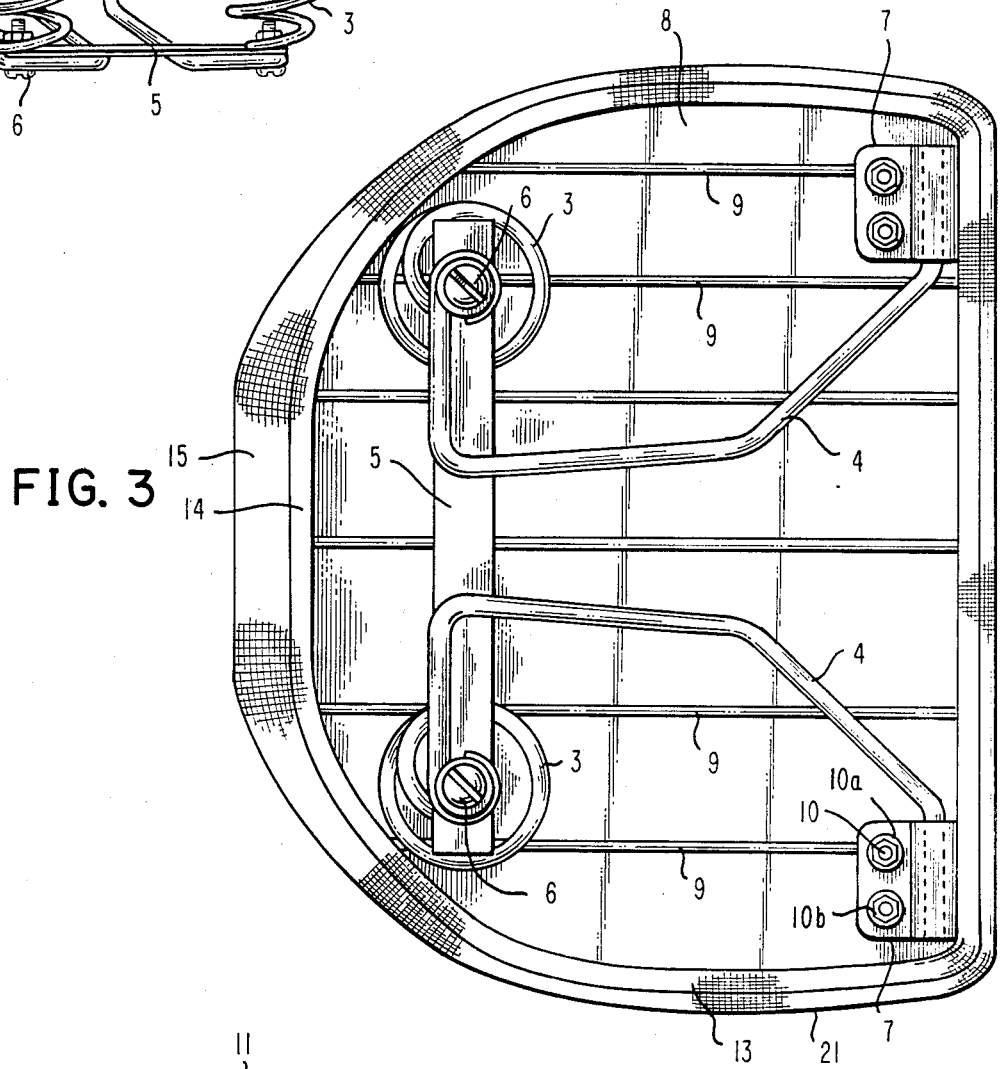
FIG. 3 is a bottom view of the seat.
Figure 4:
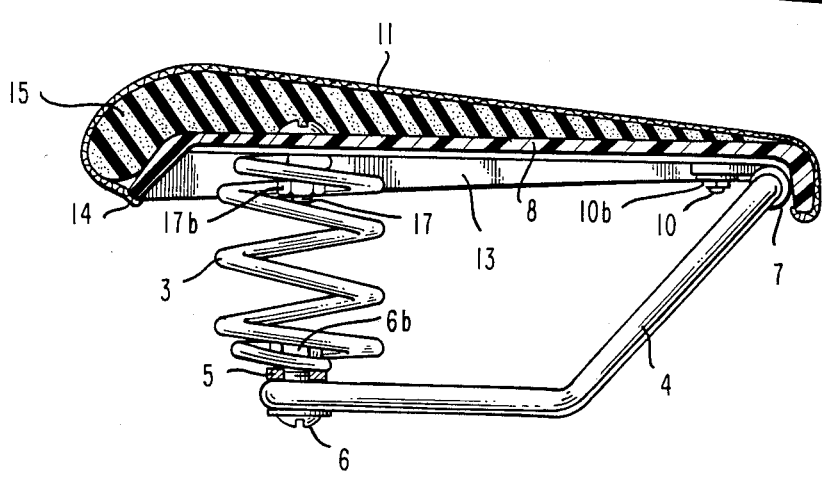
FIG. 4 is a sectional side view of the seat taken along line 4—4 of FIG. 1 and viewed in the direction of the arrows.

The shell 8 supports the cushion 2 and is of a configuration which enables the cushion 2 to fit on and conforms to its top outer surfaces, i.e. it has a larger lateral dimension than a front-to-back dimension. The top and outer peripheral surfaces of the shell are smooth and the surfaces of the under side of the shell is grooved, as seen in FIG. 3, the grooves 9 extend from the front to the rear of the shell 8. The grooves 9 impart rigidity to the shell 8 and prevent it from bending or breaking under conditions of normal use. The shell 8 is made of rigid thermosetting plastic, or metal. The shape of the shell 8, particularly with respect to the front and side walls or skirts 14 and 21, respectively, is important to the success of this invention. The front wall 14 is deeper than the back wall 12 and the side lips 13 gradually become shallower as they extend toward the back wall 12 from the front wall 14. This is significant because it permits the cushion 2 to be thicker at the front of the seat so the legs of the cyclist are more comfortable when the bicycle or adult tricycle is being driven because of the increased padding at that area. In addition, the configuration of the shell 8 is such that the cushion 2 does not interfere with the springs 3 which support the shell 8.

Coil springs 3 of the type and materials commonly used on bicycle seats are attached to the shell 8 by bolts 17, and washers 17a and nuts 17b which fit thereon. The bolts 17 extend through holes in the front portion of the top of the shell 8 and the top of the springs 3 and are attached thereto by the washers 17a and nuts 17b which fit on the bolts 17. Other bolts 6, and washers 6a and nuts 6b which fit thereon extend through the bottom of the springs 3, the cross-bar 5 (if desired) and the downward legs of two mirror image struts 4. The struts 4 are disposed on each side of the anterior-posterior centerline of the shell 8 and extend from the bottom of the springs 3 to the rear of the underside surface of the shell 8. The struts 4 are bent so that their two legs are at an obtuse angle with the support leg at each end bent at a right angle toward the perimeter of the shell 8. The bottom leg of each strut 4 supports the cross-bar 5 and is bent to accommodate the bolts 6, washers 6a and nuts 6b through the cross-bar 5 at the bottom of the springs 3. The top leg of each strut 4 is also bent at right angles toward the side perimeter of the shell 8 and is held pivotally in place by a bracket 7 attached to the rear of the bottom surface of the shell 8 by bolts 10, and washers 10a and nuts 10b which fit thereon and receives the legs through an opening which allows the legs to freely rotate. This is critical to the invention because the relationship of the springs 3, shell 8, brackets 7 and struts 4 enables the front of the seat 1 to respond to the weight of the cyclist. The seat 1 rotates on the fulcrum formed by the struts 4 and brackets 7. This helps to make the ride more stable and comfortable, as well as preventing the cyclist from falling off the seat, through the support of the springs 3 under the rigid shell 8 and cushion 2.

The seat 1 of this invention is manufactured by usual seat producing means. For example, the struts 4 are loaded into the brackets 7 which are then bolted onto the underside of the shell 8 by means of bolts 10, washers 10a and nuts 10b. The brackets 7 may be eliminated by forming the shell 8 with integral brackets. The springs 3 are then bolted to the underside of the shell 8 with bolts 17, washers 17a and nuts 17b which attach the top of the springs 3 to the shell 8. The cross bar 5 is set unto the bottom legs of the struts 4 is desired and bolted to the bottom of the springs 3 through the cross-bar 5 with bolts 6, washers 6a and nuts 6b. The cushion 2 is then fitted over the outer top and outer peripheral surfaces of the shell 8 and adhered thereto with an adhesive means. The seat cover 11 can be adhered to the cushion 2 prior to adhering the cushion 2 to the shell 8 or can be attached to the outer surfaces of the cushion 2 either permanently or removably after the cushion 2 is fixed onto the shell 8. In order to place the seat 1 on a bicycle or adult tricycle frame, a standard bicycle or tricycle bracket (not shown) is adjustably attached to the lower legs of the struts 4 and to the center post of a bicycle or adult tricycle in a sturdy frame.

A stationary or mobile two or three wheeled cycle, when equipped with the seat of the invention, can comfortably be ridden for extended time periods. The seat does not cause irritation, soreness or injury to body structures at the ischial tuberosities, perineum, crotch or thighs. The most untoward side effects from using a seat with a nose are also avoided. In addition, the seat can be made easily for use by the average female and the average male and still be suitable for all but the very large or very small person.

When a cyclist drives a bicycle or tricycle having a seat of this invention, little, if any, discomfort is felt. Because of the roughened seat cover and structure of the seat, i.e. springs, surface concavities, the cyclist does not slip off nor experience as unstable a ride as on previously designed alternative saddles. The spring arrangement allows the cyclist to shift weight from front to back without adversely affecting performance or comfort. The short anterior-posterior dimension and the spring arrangement, further, does not interfere with the downward motion of the cyclists thighs while pedaling.

The invention is not intended to be limited to the specific examples set forth herein, but can be modified in ways obvious to the artisan. The invention is limited only by the claims appended hereto.

I claim:

1. A bicycle or adult tricycle saddle-type seat without a forward extending pommel or nose comprising a flexible seat cover, a seat cushion, a rigid seat shell, springs, and a strut structure wherein said seat shell supports and is adhered to on its outer surfaces said seat cushion, has a generally four-sided perimeter in which the lateral dimensions are greater than the front-to-back dimensions, the has indented ridges in its underside extending from front to back and has an integral skirt extending downward around its perimeter;

said seat cushion is a foam polymer having its underside shaped to conform to and fit snugly on the outer surfaces of said shell and be adhered thereto wherein the outer surface of the cushion has a top and an integral perimeter skirt extending downward so that the top-to-bottom dimension of the front is greater than the top-to-bottom dimension of the back, and in which on the top thereof are two concave depressions in the front portion with a rounded convex sagital ridge therebetween and two concave depressions in the back thereof with a rounded convex sagital ridge therebetween, said back depressions being deeper than said front depressions and said back sagital ridge being shallower than said front sagital ridge;

said seat cover is shaped to fit snugly over the outer surfaces of said cushion and is permanently or removably attached thereto;

said springs are attached at their top to the front underside of said shell and at their bottom to said strut structure having extended therefrom a pair of struts which are pivotally attached to the rear underside of said shell.

2. The seat of claim 1 wherein said strut structure comprises a cross-bar attached to the bottom of the springs and having attached to and extended therefrom a pair of struts which are pivotally attached to the rear underside of said shell.

3. The seat of claim 1 wherein said seat cover is permanently attached to said cushion.

4. The seat of claim 1 wherein the outer top surface of said seat cover is roughened.

5. The seat of claim 1 wherein said top surface has a transverse convex ridge between said front and back sections.

6. The seat of claim 1 wherein the seat cushion is molded polyurethane foam.

7. The seat of claim 1 wherein the springs are coil springs.

8. The seat of claim 1 which is of sufficient width to bridge the ischial tuberosities at their most convex angle of two standard deviations of the mean width for men and women.

9. The seat of claim 2 wherein the pivotal attachments are brackets fixed to the underside of said shell.

* * * * *